No. 884,262. PATENTED APR. 7, 1908.
J. F. BRUNNER.
PLUMBER'S TESTING PLUG.
APPLICATION FILED SEPT. 10, 1907.

Witnesses
Samuel Payne
M L Lowry

Inventor
John F Brunner
By H. C. Evert & Co.
Attorneys

UNITED STATES PATENT OFFICE.

JOHN F. BRUNNER, OF PITTSBURG, PENNSYLVANIA.

PLUMBER'S TESTING-PLUG.

No. 884,262.  Specification of Letters Patent.  Patented April 7, 1908.

Application filed September 10, 1907. Serial No. 392,116.

*To all whom it may concern:*

Be it known that I, JOHN F. BRUNNER, a citizen of the United States of America, residing at Pittsburg, in the county of Allegheny and State of Pennsylvania, have invented certain new and useful Improvements in Plumbers' Testing-Plugs, of which the following is a specification, reference being had therein to the accompanying drawing.

This invention relates to plumbers testing plugs, and its object is to provide a testing plug which may be readily inserted into and removed from a house-trap to test the efficiency of the plumbing work.

The invention comprises a hollow plug-carrying body provided with means for securing it within a pipe, a collapsible plug, and a discharge pipe and faucet.

The construction of the improvement will be fully described hereinafter, in connection with the accompanying drawing which forms a part of this specification, and its novel features will be set forth in the appended claims.

Figure 1:
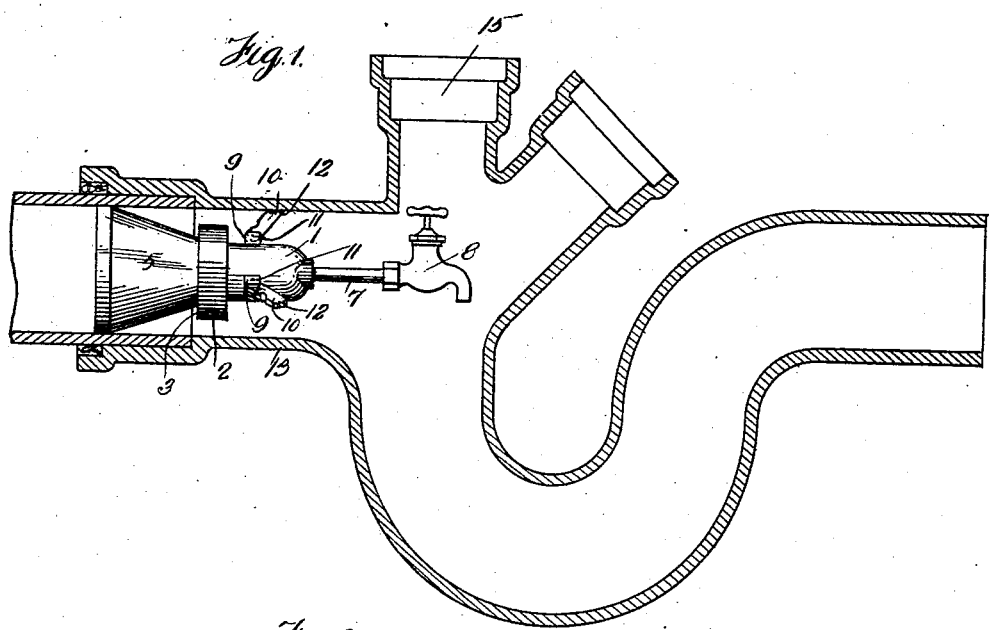
Figure 2:
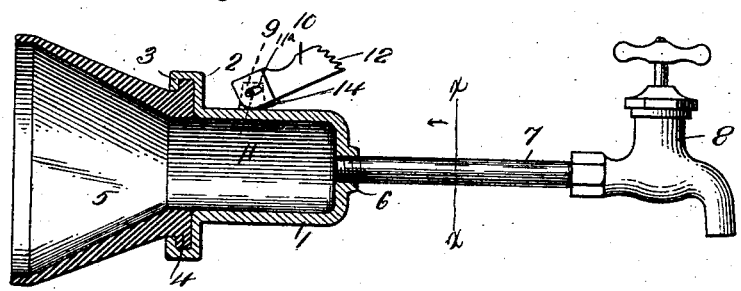
Figure 3:
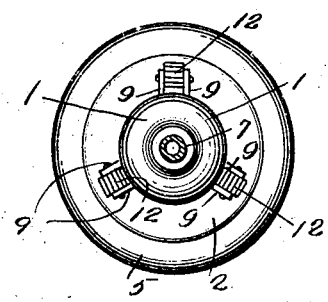
Figure 4:
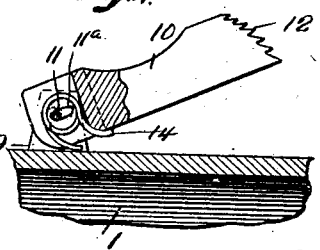

In the drawing: Figure 1 is a side elevation of a testing plug embodying the invention, showing its position within a house trap. Fig. 2 is a longitudinal section of the plug on an enlarged scale, Fig. 3 is a section on the line x—x of Fig. 2, and, Fig. 4 is a detail sectional view on an enlarged scale of one of the spring clamping arms of the plug.

The reference numeral 1 designates a substantially cylindrical plug-carrying body or member provided at one end with an annular flange 2 having an overhanging lip 3 to engage an annular flange 4 formed on a collapsible conical plug 5 preferably made of rubber. The opposite end of the member 1 is formed with a threaded socket 6 to which is secured one end of a pipe 7 provided with a faucet 8.

The member 1 is formed with equi-distant pairs of perforated ears 9 between which are pivotally secured clamping arms 10 upon pins 11, said pins extending through elongated slots 11ᵃ of the arms 10.

The free ends 12 of the clamping arms are serrated to adapt them to grip the walls of the trap 13 and surrounding each of the pivot pins 11 is a coil spring 14, said spring serving to force the clamping arms away from the member 1 and into engagement with the trap 13.

The utility and operation of the device constructed as above described will be readily understood by those skilled in the art to which the invention relates. The plug is inserted into the trap 13 to the position shown in Fig. 1, and after the system of pipes of which the trap forms a part, is filled with water to test the joints and pipe connections, the water is drawn off through the faucet 8 after which the plug in withdrawn through the trap connection 15.

It will be apparent that the pressure of water against the rubber plug 5 will force the serrated clamping arms firmly into contact with the trap, and thus secure the plug in place without liability of its accidental dislodgment.

The clamping arms 10 are adapted to be drawn out longitudinally to release them from spring pressure when the plug is inserted and by rearward pressure on said arms they are subjected to the tension of the spring to force them into clamping engagement with the trap.

Having fully described my invention what I claim as new and desire to secure by Letters Patent, is 1. A testing plug, comprising a hollow body, a collapsible cone attached thereto, spring-pressed arms secured to the hollow body, and a faucet connected to said body.

2. A testing plug, comprising a cylindrical hollow body, a yielding cone attached thereto, a pipe and faucet projecting from said hollow body, and serrated spring-pressed arms secured to said body.

3. A testing plug, comprising a flanged cylindrical hollow body, a rubber cone attached thereto, a discharge pipe projecting from said hollow body, and means for clamping said body within a trap, consisting of a plurality of spring pressed arms formed with elongated slots and serrated at their free ends.

In testimony whereof I affix my signature in the presence of two witnesses.

JOHN F. BRUNNER.

Witnesses:
    MAX H. SROLOVITZ,
    A. J. DEER.